United States Patent
Jones et al.

(10) Patent No.: US 9,451,296 B2
(45) Date of Patent: Sep. 20, 2016

(54) EXTRACTING DATA FROM ADVERTISEMENT FILES FOR AD INSERTION

(71) Applicant: AT&T Intellectual Property I, L.P., Atlanta, GA (US)

(72) Inventors: Todd W. Jones, Kansas City, MO (US); Shauna Adams, Kansas City, KS (US); James Morgan, Parkville, MO (US); Thomas Paterson, Liberty, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/463,330

(22) Filed: Aug. 19, 2014

(65) Prior Publication Data

US 2016/0057465 A1    Feb. 25, 2016

(51) Int. Cl.
*H04N 7/10*        (2006.01)
*H04N 21/2343*     (2011.01)
(Continued)

(52) U.S. Cl.
CPC ...... *H04N 21/234309* (2013.01); *H04N 19/12* (2014.11); *H04N 19/136* (2014.11); *H04N 19/40* (2014.11); *H04N 21/2335* (2013.01); *H04N 21/2347* (2013.01); *H04N 21/2351* (2013.01); *H04N 21/23418* (2013.01); *H04N 21/23424* (2013.01); *H04N 21/234381* (2013.01); *H04N 21/266* (2013.01); *H04N 21/4398* (2013.01);
(Continued)

(58) Field of Classification Search
USPC ..................................................... 725/94, 32
IPC .................. H04N 21/440218,21/4398, 21/2343
See application file for complete search history.

(56) References Cited

U.S. PATENT DOCUMENTS 5,898,467 A    4/1999  Woo
6,915,528 B1   7/2005  McKenna
(Continued)

FOREIGN PATENT DOCUMENTS

WO    WO2012088359 A2    6/2012

OTHER PUBLICATIONS

Macq, J. F., P. Rondao Alface, and N. Verzijp ALU. "Capabilities of Current and Next-Generation Delivery Networks involved in FascinatE Services." (2011). http://www.fascinate-project.eu/wp-content/uploads/Public%20Deliverables/D4.2.1%20Capabilities%20of%20Current%20and%20Next-Generation%20Delivery%20Networks%20involved%20in%20FascinatE%20Services.pdf.
(Continued)

*Primary Examiner* — Pankaj Kumar
*Assistant Examiner* — Charles N Hicks
(74) *Attorney, Agent, or Firm* — Jackson Walker L.L.P.

(57) ABSTRACT

A video processing method includes receiving a multimedia file including a first video file encrypted with a first compression algorithm and converting the first video file to a second video file, which is encrypted with a second compression algorithm. The method includes extracting, from the second file, video data indicative of at least one video characteristic of the second file and displaying the video data on a display screen or forwarding the video data to a content insertion server. The first video compression algorithm may be a MPEG-2 video compression algorithm and the second video compression algorithm may be an H.264 algorithm and/o an H.265 algorithm. The video data may include run time data indicative of a run time of the second video file, frame rate data indicative of a frame rate of the second video file, and pixel data indicative of a resolution of the second video file.

20 Claims, 4 Drawing Sheets

(51) Int. Cl.
    *H04N 19/136*     (2014.01)
    *H04N 19/12*     (2014.01)
    *H04N 19/40*     (2014.01)
    *H04N 21/234*     (2011.01)
    *H04N 21/2347*     (2011.01)
    *H04N 21/235*     (2011.01)
    *H04N 21/266*     (2011.01)
    *H04N 21/233*     (2011.01)
    *H04N 21/81*     (2011.01)
    *H04N 21/4402*     (2011.01)
    *H04N 21/439*     (2011.01)
    *H04N 17/02*     (2006.01)

(52) U.S. Cl.
    CPC .... *H04N 21/440218* (2013.01); *H04N 21/812* (2013.01); *H04N 17/02* (2013.01)

(56) References Cited

U.S. PATENT DOCUMENTS

| | | | |
|---|---|---|---|
| 7,259,796 B2 | 8/2007 | Sha et al. | |
| 7,676,142 B1* | 3/2010 | Hung | G11B 27/005 348/446 |
| 7,840,979 B2 | 11/2010 | Poling et al. | |
| 8,005,838 B2 | 8/2011 | Van et al. | |
| 8,204,128 B2 | 6/2012 | Huchet et al. | |
| 8,305,491 B2 | 11/2012 | Kondo | |
| 8,516,529 B2 | 8/2013 | Lajoie et al. | |
| 8,582,578 B2 | 11/2013 | Meuninck | |
| 2007/0250863 A1 | 10/2007 | Ferguson | |
| 2008/0152244 A1 | 6/2008 | Suino | |
| 2009/0147840 A1* | 6/2009 | Sahdra | H04N 5/76 375/240.01 |
| 2009/0187939 A1 | 7/2009 | Lajoie | |
| 2010/0287580 A1 | 11/2010 | Hardin et al. | |
| 2011/0082807 A1 | 4/2011 | Parekh et al. | |
| 2012/0192230 A1 | 7/2012 | Algie et al. | |
| 2012/0321205 A1 | 12/2012 | Lai et al. | |
| 2013/0007814 A1 | 1/2013 | Cherian et al. | |
| 2013/0104173 A1 | 4/2013 | Tjio et al. | |
| 2013/0156095 A1* | 6/2013 | Li | H04N 21/233 375/240.02 |
| 2013/0329783 A1 | 12/2013 | Sato | |
| 2014/0026052 A1 | 1/2014 | Thorwirth et al. | |
| 2014/0099034 A1 | 4/2014 | Rafati et al. | |
| 2014/0112394 A1 | 4/2014 | Sullivan et al. | |
| 2015/0245153 A1* | 8/2015 | Malak | H03G 7/00 381/57 |

OTHER PUBLICATIONS

Aggoun, A., et al. "Multimedia delivery in the future Internet" (2008). http://bura.brunel.ac.uk/bitstream/2438/2891/1/White_Paper_FF_Ver2_21102008.pdf.

\* cited by examiner

EXTRACTING DATA FROM ADVERTISEMENT FILES FOR AD INSERTION

BACKGROUND

1. Field of the Disclosure

Disclosed subject matter is in the field of multimedia content and, more specifically, the delivery of multimedia content over a content delivery network.

2. Description of the Related Art

Multimedia content provided by a service provider may include programming content and advertising content. The advertising content may be dynamically inserted into the programming content before streaming to the end user. The actual run time of an advertisement must be consistent with the amount of time slotted for the ad, usually either 30 seconds or 60 seconds, to avoid detectable mistiming artifacts. If an advertisement encrypted with a first compression algorithm needs to be inserted into programming content encrypted according to a second compression algorithm, it may be necessary to re-encode the advertisement using the second compression algorithm. While metadata for the advertisement, including run time information, may be readily accessible with respect to the advertisement file as received, the advertisement file encrypted with the second compression algorithm may not indicate all of the same metadata explicitly.

DESCRIPTION OF EMBODIMENTS

Embodiments of subject matter disclosed herein include embodiments directed to a multimedia processing method that includes receiving a first video file encrypted with a first video compression algorithm. The first video file may correspond to a 30-second or 60-second advertisement suitable for inclusion during presentation of broadcast or other linear programming. In other embodiments, the first video file may be longer or shorter and may be used in conjunction with time-shifted content including, as an example, video on demand content.

The multimedia processing method may include converting the first video file to a second video file, where the second video file is encrypted with a second video compression algorithm. The second video compression algorithm may achieve superior or preferable performance to the first video compression algorithm. For example, the second video compression algorithm may achieve a higher average compression factor, thereby enabling the processing of higher resolutions for the same frame rate at substantially the same bit rate.

In some embodiments, the multimedia processing method includes extracting, from the second video file, video data indicative of at least one video characteristic of the second video file. In some embodiments, the second video file format may not expose certain video data including the run time of the video file, the frame rate, and the resolution, to the applicable operating system or otherwise provide an interface for accessing the video data. In these embodiments, the extracting of the video may include an automated routine that accesses explicitly indicated information from one or more packets in the second video file and manipulates the information to derive values for parameters including run time, frame rate, and resolution.

In at least one embodiment suitable for use with a second video file encoded with H.264 or H.265 compression and packetized for delivery via an IP-based multimedia network, each packetized video packet includes a 4-byte header that contains the FRAME COUNT of the entire file as well as the FRAME RATE. While an H.264 file lacks an explicit indicator of run time, at least one embodiment of the disclosed video processing method extracts the FRAME COUNT and FRAME RATE information from the second video file and calculates a RUN TIME from the extracted values. For example, at least one embodiment may calculate the RUN TIME based on a simple division of the FRAME COUNT by the FRAME RATE.

Embodiments of the video processing method disclosed herein may expose run time data and other video data derived from explicitly indicated parameters. Exposing derived video data may include displaying the derived values to an administrator or other operator of one or more of the video servers within a national or regional head-end office. In other embodiments, exposing the derived video data may include forwarding the derived values to a content insertion server and/or a streaming server located downstream of a server that performs the video compression conversion.

As suggested above, the first video file may be an MPEG-2 file, i.e., a file encrypted using an MPEG-2 video compression algorithm, while the second video file may be an H.264 or H.265 file that employs H.264 or H.265 video compression. Converting a single ad to the more sophisticated compression algorithms of H.264 or H.265 may be of limited direct benefit in terms of overall file size, but may provide significant benefit in terms of buffer storage requirements and maximum bit rate requirements for a 60 minute program in which 15 minutes or more may be dedicated to commercial advertising. Moreover, conversion of advertising content may be desirable or necessary for use with H.264/H.265 programming streams.

In at least some embodiments, the video data derived or extracted by the disclosed may include, in addition to run time data indicative of a run time of the second video file, frame rate data indicative of a frame rate of the second video file, and pixel data indicative of a resolution of the second video file.

In some embodiments, the extraction or derivation of video data is disclosed in the context of a head-end office that ingests file-based multimedia content and readies the content for streaming delivery to end user premises over an access network that might include a coaxial cable physical layer, a fiber optic or digital subscriber line twisted-pair physical layer, or a wireless physical layer in the case of satellite delivery networks. In at least one embodiment, the content readiness operations performed by a video head-end office may include performing a quality check including a loudness check performed for compliance with the Commercial Advertisement Loudness Mitigation (CALM) Act (H.R. 1084, S. 2847) (2010), which went into effect on Dec. 13, 2012.

If a video file received from an advertising source fails an initial quality-control check, the video head-end office may include resources that attempt to modify the video file until the video file passes the quality check. The resources for modifying a video file may include a loudness monitor/adjustment server that attempts to modify the audio content of any video file that fails the CALM compliance test. In these embodiments, the method may include performing a second quality-control test after any appropriate modifications of the file. In some of these embodiments, any file that fails the second quality-control check may be withdrawn from further processing and logged as a pre-transcoding failure.

Although the drawings illustrate an application of the disclosed video processing method that operates on advertising files primarily or exclusively, other embodiments may monitor and modify other types of content for other applications. Advertising files are particularly suitable for use in content insertion environments where different regional head-end offices need to inject local advertising that differs from the local advertising of neighboring head-end offices. For example, advertising for locally provided goods and services including automobiles and trucks is generally local and must be differentiated between different cities within a state or between two or more states. In addition, ad insertion servers may be configured to access demographic information or other forms of personal information and make ad insertion determinations based, at least in part, on the personal information.

Other embodiments disclosed herein are directed to a head-end office and the one or more video servers that may be located at the head-end office. The head-end offices of a particular type of content delivery network may include multiple tiers of head-end offices including a super head-end office or national head-end office that feeds nationally syndicated content to a collection of regional head-end offices referred to herein as video head-end offices. The video head-end office may include resources for ingesting multimedia and performing quality checks on ingested content. In addition, the video head-end office may include hardware and/or software for use in modifying loudness or other parameters. The video head-end office may also include a video processing and routing server configured to perform the compression algorithm conversion and a content insertion server configured to access advertising content stored in database storage and inserting the ad into a programming stream at an appropriate juncture, for streaming delivery to end user premises.

In embodiments that include a derivation of the run time of the second video file, the method or operations may further include: comparing the derived run time against the time allotted for ad and taking corrective action when the derived run time determined and the allotted run time differ by an amount exceeding a threshold. Corrective action may include, as an example, replacing the ad with a different ad.

Figure 1:
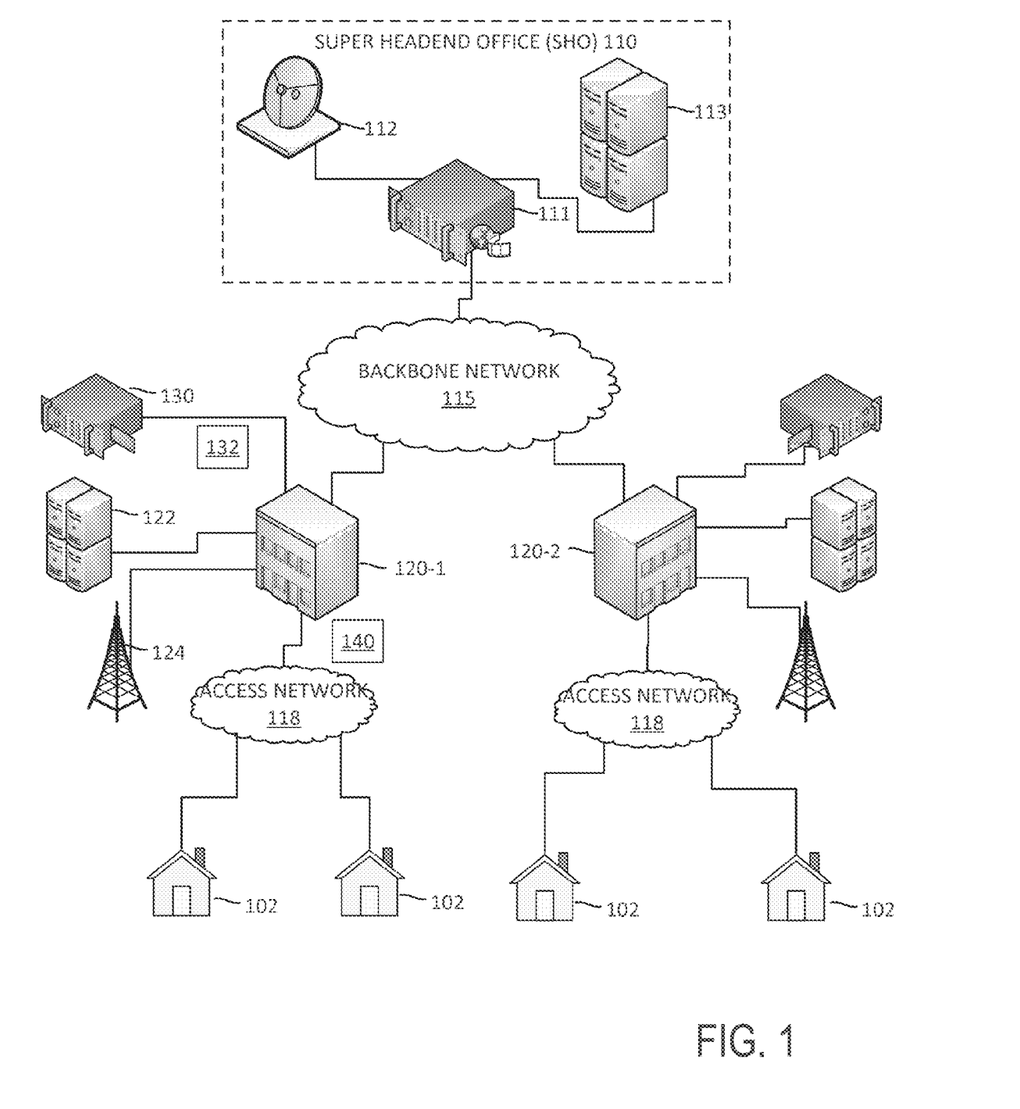
FIG. 1 illustrates elements of a content delivery network.

FIG. 1 illustrates selected elements of a multimedia content delivery network 100, referred to herein simply as content delivery network 100. Content delivery network 100 may be implemented as an Internet Protocol television (IPTV) network, a cable network, a satellite network, or a broadcast delivery network. In the interests of clarity and simplicity, the drawings are described primarily with respect to an IPTV system, but techniques described herein with respect to deriving video information from a video stream for use in applications including ad insertion may be equally applicable to cable, satellite, and other content delivery systems.

The content delivery network 100 illustrated in FIG. 1 employs a tiered delivery model that a includes a super head-end office 110 including a super head-end office server (SHS) 111, which is shown in FIG. 1 coupled to a satellite dish 112 and a video server 113. Satellite dish 112 may provide linear and time-shifted content, including video on demand (VOD) content, received from a satellite (not depicted) to SHS 111. Similarly, video server 113 may provide linear and time-shifted content, including VOD content to SHS server 111. As used in this disclosure, multimedia content encompasses audio content, video content, still image or picture content, and audio/video content. In at least one embodiment, SHS server 111 includes a streaming server configured to forward multimedia content packets over a broadband network, identified herein as backbone network 115, to regional offices, each of which is referred to herein as a video head-end office (VHO) 120 and two of which are shown in FIG. 1, including first VHO 120-1 and second VHO 120-2. In some embodiments, SHS server 111 sends multimedia content to multiple VHOs 120, simultaneously or substantially simultaneously, using a multicast communication protocol.

The VHO 120 can distribute multimedia broadcast programs via an access network 118 to commercial and/or residential buildings, referred to herein as end user premises 102. In at least one embodiment, access network 118 includes a group of digital subscriber line access multiplexers (DSLAMs) located in a central office or a service area interface that provide broadband services over optical links or copper twisted pairs to end user premises 102. End user premises 102 may include multi-dwelling units that house a plurality of different subscribers.

In at least one embodiment, end user premises 102 may include customer premise equipment including, as examples, a residential gateway that provides an interface between access network 118 and a wired and/or wireless local area network within end-user premises 102 and a set top box that may decode or otherwise process a multimedia signal and generate audio and video signals in a native format for display or playback on a television or display screen. The customer premises equipment can use common communication technology to distribute broadcast signals to set top boxes which in turn present broadcast channels to media devices such as computers or television sets managed in some instances by an infrared or RF remote control.

The customer premises devices can, in some embodiments, utilize tethered interface technologies (such as coaxial or phone line wiring) or can operate over a common wireless access protocol. With these interfaces, unicast communications can be invoked between the media processors and subsystems of the IPTV media system for services such as VOD, browsing an electronic programming guide (EPG), or other infrastructure services.

In the content delivery network 100 illustrated in FIG. 1, each VHO 120, in addition to receiving content from SHO 110, also receives time-shifted and linear content from a regional video server 122 and broadcasted content from local transmission towers 124, one of which is shown for each VHO 120, although it will be apparent to those of skill in the field that VHO 120 may receive broadcasted signals from multiple transmission towers.

The VHO 120 illustrated in FIG. 1 are also shown receiving advertisements from an advertising server 130. Advertising servers 130 represent any source of advertisement provided to VHO 120. Sources of advertising may include the organization or entity whose goods or services are being advertised, or from any third-party producer of advertising content. The VHO 120 may include facilities for processing an ad files 132 received from advertising server 130 into a multimedia content stream 140 that VHO 120 transmits to end user premises 160 via an access network 118. Access network 118 includes a physical media for delivering content to end user premises 102. The physical media of access network 118 may include fiber optic cable, co-axial cable, digital subscriber line twisted pair wiring, and wireless media for satellite reception.

Figure 2:
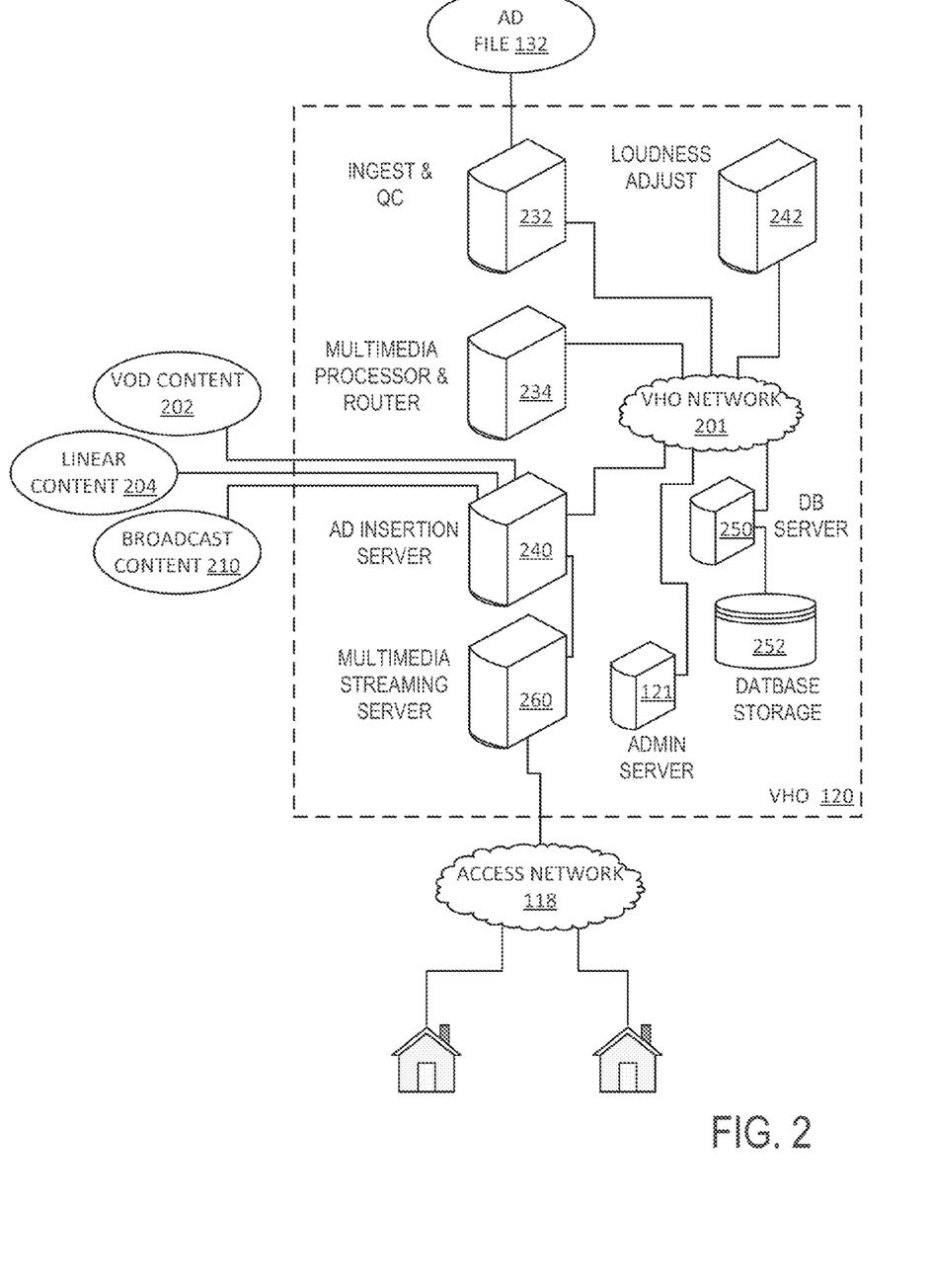
FIG. 2 illustrates elements of a head-end office in the network of FIG. 1.

Referring now to FIG. 2, the VHO 120 of FIG. 1 is shown in greater detail to emphasize aspects of ad insertion. The VHO 120 illustrated in FIG. 2 includes a number of servers configured to receive and process multimedia content including VOD content 202, linear content 204, broadcast content 210, and advertising content identified in FIG. 2 as ad files 132.

The VHO 120 illustrated in FIG. 2 includes an administrative server 121, an ingest and quality-control server 232, a multimedia processor and router server 234, an ad insertion server 240, a loudness adjustment server 242, a database server 250 connected to database storage 252, and a multimedia streaming server 260. Although VHO 120 illustrated in FIG. 2 includes the specific set of servers referred to previously, other embodiments may combine features of the individually depicted servers into a fewer or greater number of physical servers in other embodiments.

The VHO 120 illustrated in FIG. 2 includes a VHO network 201 interconnecting the various servers 232, 234, 242, 240, 250, and 260. In the configuration illustrated in FIG. 2, each of the servers is connected via VHO network 201 to a database server 250 connected to database storage 252 such that a common database is shared among the various servers. In this configuration, no explicit storage is shown for each of the individual servers although it will be appreciated that, in other embodiments, one or more of the servers illustrated in FIG. 2 may include and use its own local storage in lieu of the shared database storage 252.

Administrative server 121 may include or perform supervisory features for automating the content ingest and readiness workflow. In at least one embodiment, administrative server may invoke, access, request, or otherwise initiate functions or features of the other VHO servers as discussed in detail below with respect to FIG. 3.

As suggested by its name, ingest and quality-control server 232 may be responsible for receiving ad files 132 from various sources and performing an initial quality-control check on the ad files 132. Ingest and quality-control server one 232 may include features for automated, file-based quality-control including features for ingesting, editing, transcoding, and archiving multimedia files. Ingest and quality-control server 232 may include features of one or more commercially distributed quality-control applications including, as an example, the Baton quality-control software from Interra Systems.

In at least one embodiment, one of the quality-control checks performed by ingest and quality-control server 232 is a loudness check. Ingest and quality-control server 232 may ensure, for example, that an ad file 132 received from an advertising server 130 is free from video and audio quality error, plays out in a playout server correctly, and meets regulatory compliance that is mandatory within the relevant or applicable geography. Ingest and quality-control server 232 may, for example, ensure that elementary audio and video streams included in ad file 132 have an appropriate format depending upon a playout specification but also that the elementary streams meet a conformance standard including the detection of any missing or corrupted macroblocks, a maximum bit rate conformity, as well as other checks including, as examples, average bit rate, percentage of no packets, program clock reference (PCR) inaccuracy, and program counts.

In at least one embodiment, the ad files 132 may be wrapped within a Material Exchange Format (MXF) wrapper format that supports a number of different streams of coded content encoded in any of a variety of video and audio compression formats, together with a metadata wrapper that describes the content. Generally, an MXF file format includes a full time code and metadata support and is platform agnostic. In this format, a number of pieces of metadata associated with the ad file are exposed to the operating system of the applicable server and are readily available and visible for display by a user or for use in an application. For example, when an ad file 132 is in an MPEG-2 format, the run time of the ad, the frame rate, format and resolution, including vertical and horizontal size, are explicitly indicated and readily accessible.

However, in at least some embodiments, the advertisement insertion process performed by VHO 120 may include a video compression conversion step in which, for example, an MPEG-2 video is converted to an H.264 format. In the H.264 format, the file contains no file detail mechanism to assure the programmer/operator that the applicable ad will run at run time without detectable error and with the correct frame rate and format resolution. If these ad files do not run for the specific time allotted, video and/or audio mute or blackout may occur resulting in alarms and/or service outages or apparent service outages.

Returning to FIG. 2, VHO 120 as illustrated includes multimedia processor and router server 234. In at least one embodiment, multimedia processor and router server 234 encompasses a protocol agnostic, content intelligent server that switches and processes MPEG, IP, and Ethernet packets. The multimedia processor and router server 234 may support features including digital simulcast, standards based ad splicing, time shifting, and switched digital video (SDV). The multimedia processor and router server 234 may include features of commercially distributed product including the BMR 1200 from ARRIS and formerly referred to as the Big Band server. In at least one embodiment, multimedia processor and router server 234 is configured to convert the compression format of an ad file 132 from a first video compression format to a second video compression format. The first video compression format may be, as an example, an MPEG 2 video compression format while the second video compression format may be a compression format that achieves greater compression including, as an example, an H.264 or H.265 compression format.

VHO 120 illustrated in FIG. 2 includes a loudness adjustment server 242 that may be employed to adjust the volume or loudness of an ad file 132 upon failing a quality-control or standard compliance test performed by ingest and quality-control server 232. Inconsistency in loudness levels is pervasive in the broadcast industry. Inconsistencies in volume of broadcasted content include, as examples, a commercial advertisement that is substantially louder than the program in which the advertisement plays, a scene in a program that is substantially louder than previous scenes, scenes in which the actors lips are moving but no dialogue is heard, and a channel that appears to have a consistently higher volume level than other channels. Volume inconsistencies have prompted the United States and other governments to impose legislation regulating and providing standards for loudness control. In the United States, for example, the CALM Act went into effect in 2012. In at least one embodiment, ingest and quality-control server 232 performs a check to ensure compliance with the CALM Act. If the CALM Act check fails, the VHO 120 illustrated in FIG. 2 may attempt to correct or otherwise modify the ad file 132 for CALM Act compliance. In at least one of these embodiments, loudness adjustment server 242 includes features for analyzing loudness and correcting loudness for compliance with the CALM Act. Loudness adjustment server 242 in some embodiments may include features similar to features found in commercially distributed audio processing devices including, as an example, the Dolby program optimizer DP600 from Dolby Laboratories.

The ad insertion server 240 illustrated in FIG. 2 may include features for dynamic selection and inclusion of advertisements into programming content based on a number of factors. Ad insertion server 240 may be configured to dynamically select and insert advertisement into broadcast content 210, linear content 204, as well as time-shifted or VOD content 202. Ad insertion server 240 may include features similar to features found in commercially distributed advertisement insertion products including, as an example, the SeaChange Infusion product from SeaChange International.

Multimedia streaming server 260 illustrated in FIG. 2 is configured to stream multimedia content to end user premises 102 via access network 118 according to one or more known streaming distribution protocols. Multimedia streaming server 260 may support distribution over IP-based access networks, including unicast and multicast distribution, distribution over coaxial cable access networks, and distribution via satellite access networks. Although FIG. 2 illustrates multimedia streaming server 260 distinct from ad insertion server 240, in at least one embodiment, the functionality of multimedia streaming server 260 and ad insertion server 240 are implemented in common hardware. Similarly and more generally, the functionality associated with any of the servers illustrated in FIG. 2 may be combined with the functionality of any other of the servers in a single server, a partitioned server, and so forth.

As illustrated in FIG. 2, VHO 120 ingests and processes ad files 132 via ingest and quality-control server 232, but receives programming content including linear content 204, VOD content 202, and broadcast content 210, directly at ad insertion server 240. In other embodiments, all content, including the programming content, may be received and processed through ingest and quality-control server 232.

As previously suggested, VHO 120 may perform a video compression algorithm conversion on advertisements received from an advertising source. The compression conversion may be performed to achieve better compression for advertising or for consistency with the programming content in which the advertisement will ultimately play out. However, to the extent that the original format in which an advertisement file is received provides readily accessible metadata indicating various critical parameters associated with the advertisement, the conversion process may effectively suppress or hide needed and useful information readily accessible by network operators and others who may need to access the information for quality assurance purposes.

Figure 3:
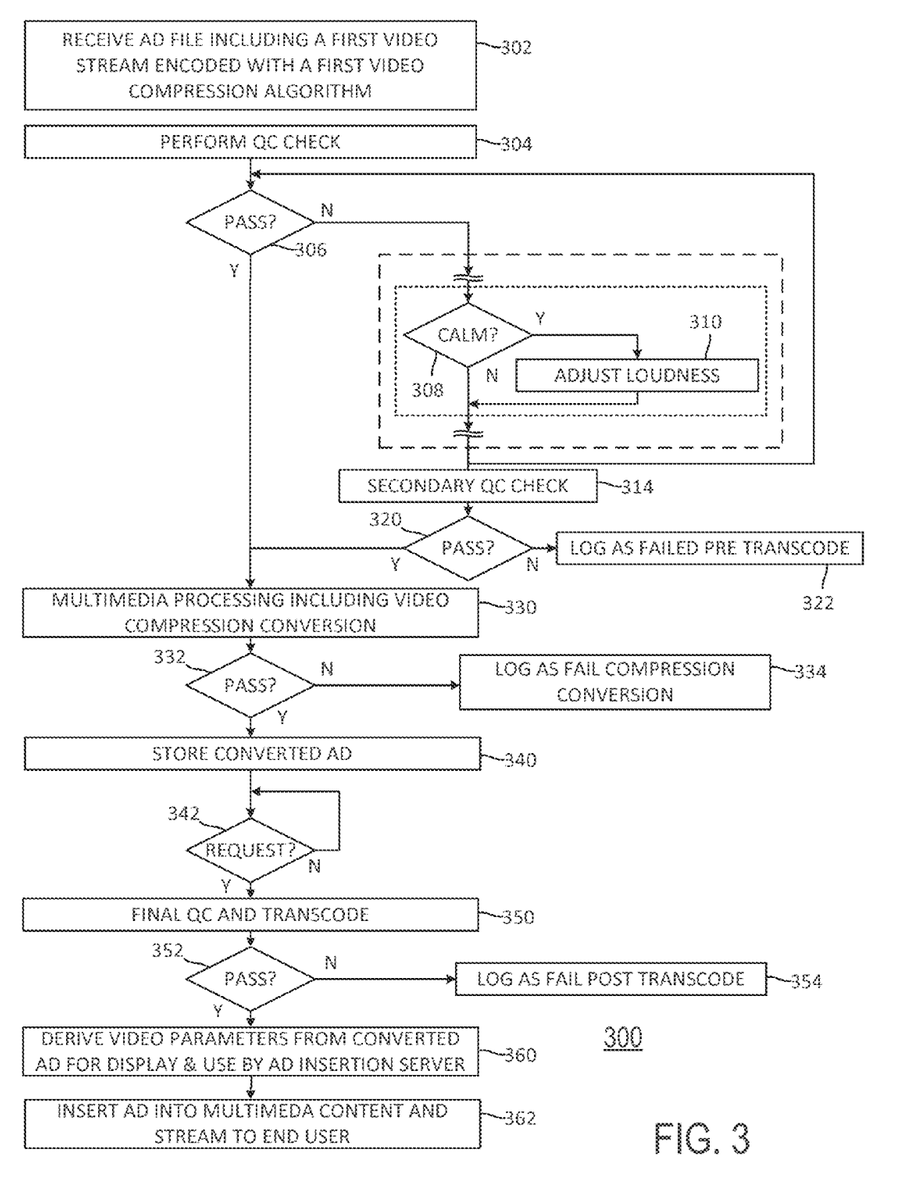
FIG. 3 illustrates elements of a multimedia processing method.

Referring now to FIG. 3, selected elements of a method 300 for performing advertisement insertion in a way that supports conversion of a video compression algorithm while at the same time exposing metadata associated with the converted advertisement to the network operator or to an ad insertion server employed by the network operator are shown. If, for example, an ingested advertisement is received in an MPEG-2 video compression format and is subsequently converted to an H.264 or H.265 file format and stored until dumped to an insertion server system, it may be useful if the ad insertion server can sort, filter, and display intrinsic video parameters including, as examples, file size, frame rate, horizontal/vertical pixel size, format, and perhaps most importantly, the run time of the file.

the embodiment of method 300 illustrated includes receiving, block 302, an advertisement file that includes a first video stream encoded with a first video compression algorithm. In at least one embodiment, the first video compression algorithm is compliant with the MPEG 2 video compression algorithm. The advertisement file formatted according to the incoming video compression algorithm may be referred to herein as the MPEG-2 file.

The quality-control check performed on the MPEG-2 file may include any of the various quality-control checks. In the method 300 illustrated in FIG. 3, however, the quality-control check includes a loudness compliance check or CALM check that determines whether the MPEG-2 file complies with the loudness criteria set forth in the CALM Act. After the initial quality-control check is performed at block 304, the illustrated embodiment of method 300 determines whether the quality-control check passed or failed at block 306. If the quality-control check did not pass, the illustrated embodiment of method 300 performs one or more operations to attempt to bring the MPEG-2 file into compliance with applicable quality-control and statutory and regulatory standards.

The embodiment of method 300 illustrated in FIG. 3 determines, block 308, whether the MPEG-2 file passed the CALM compliance check performed by the quality-control program. If the MPEG-2 file failed the CALM compliance check, a loudness adjustment process, block 310, is performed on the MPEG-2 file. As suggested previously, the loudness adjustment operations may be performed by the loudness adjustment server 242 (FIG. 2). After each of the operations performed on an MPEG-2 file that fails the initial quality-control check at block 304 are performed, including any loudness adjustment operations performed at block 310, the MPEG-2 file is subjected to a secondary quality-control check at block 314. If the secondary quality-control passes, at block 320, method 300 proceeds to block 330. If the secondary quality-control fails, the ad file is logged as a pre-transcode failure at block 322

The embodiment of method 300 illustrated in FIG. 3 includes a multimedia processing operation, block 330, that includes video compression algorithm conversion. In at least one embodiment, the multimedia processing performed at block 330 includes the conversion of video compression algorithm from a metadata rich format such as an MPEG-2 video compression format to an advanced video compression format including, as examples, H.264 or H.265 compression algorithm formats. As suggested previously, the multimedia processing operations performed at block 330 may be performed by a multimedia processor and router server 234 of FIG. 2. Multimedia processor and router server 234 may include a determination of whether the processing, including any conversion of video compression algorithm, is successfully completed. As illustrated in FIG. 3, if the multimedia processing performed at block 330 does not pass, at block 332, the advertisement file is logged as failing compression conversion at block 334. If the multimedia processing performed at block 330 completes successfully, the converted advertisement is stored, at block 340, in a storage facility such as database storage 252 of FIG. 2.

The stored advertisement may then remain in database storage 252 or in other suitable storage until the advertisement is subsequently requested or otherwise accessed for inclusion in a multimedia content stream to be provided to an end user premises. As illustrated in FIG. 3, upon detecting a request or another suitable access of a converted advertisement file at block 342, the illustrated embodiment of method 300 performs, block 350, a final quality-control check and performs any transcoding needed. Transcoding may include, as an example, converting from a high definition format to standard definition or another lower level resolution format depending upon the requirements of the receiving device. Upon completion of the final quality-control and transcoding operation at block 350, a determination is made at block 352 whether the final quality-control check and transcoding was successfully completed. If, at block 352, method 300 determines that the final quality-control did not complete successfully, the advertisement file is logged as failing post transcode at block 354. If the final quality-control check successfully completes, method 300 proceeds to block 360 in which video parameters are derived from the converted ad for display or use by the ad insertion server. Method 300 as shown in FIG. 3 further includes inserting, block 362, the ad into a multimedia content stream for delivery to an end user. In some embodiments, the derived video parameters including the run time may be compared against the time allotted for an ad. If the run time derived from the second video file differs from the time allotted for the ad by a margin that exceeds a specified or predetermined threshold, embodiments of method 300 may take corrective action including, as one example, replacing the ad with a different ad or editing the ad to achieve a greater degree of match between the actual run time and the allotted run time.

The operations illustrated in FIG. 3 may, in some embodiments, represent operations performed by VHO 120 of FIG. 2 and, more specifically, performed by one or more of the set of VHO servers including administrative server 121, ingest and quality control server 232, multimedia processor and router server 234, ad insertion server 240, loudness adjustment server 242, and multimedia streaming server 260. In at least one embodiment, administrative server 121 invokes one or more of the other servers to perform the applicable functions. For example, administrative server 121 may invoke: ingest and quality-control server 232 to perform blocks 304, 314, and 350; multimedia processor and router 234 to perform blocks 330 and 340; and loudness adjustment server 242 to perform blocks 308 and 310. Administrative server 121 may also invoke ad insertion server 240 in conjunction with multimedia streaming server 260 to perform block 362. In some embodiments, administrative server 121 may be further responsible for performing block 360 including the derivation of one or more video parameters corresponding to the converted advertisement as well as the use of any derived video parameters for display or for transmission to another server such as ad insertion server 240.

Figure 4:
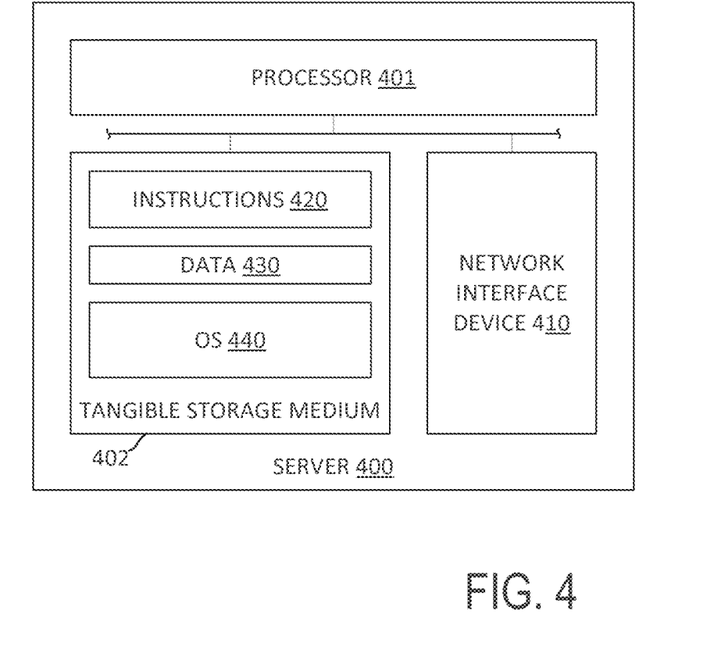
FIG. 4 illustrates elements of a multimedia router and processor.

Referring now to FIG. 4, selected elements of a server 400 are illustrated. In at least one embodiment, each of the servers included in VHO 120 as illustrated in FIG. 2 include the elements of server 400. As illustrated in FIG. 4, server 400 includes a processor 401, a tangible storage medium 402 accessible to processor 401, and a network interface device 410 coupled to processor 401. Network interface device 410 enables server 400 to communicate with other servers and other devices via a network intermediary not illustrated in FIG. 4. Network interface device 410 may support communication with other servers and other devices over wireless or wireline physical media. Network interface device 410 may include a communication protocol stack supporting any one or more of a variety of standardized and/or proprietary communication protocols including, as an example, a UDP/IP protocol stack to support real-time streaming application protocols including, as an example, Real-time Transfer Protocol (RTP). Tangible storage medium 402 illustrated in FIG. 4 includes instructions 420, data 430, and an operating system 440. Instructions 420 may include one or more application programs representing instructions executable by processor 401 or by a another processor. The executable instructions 420, when executed by processor 401, cause server 400 to perform various operations. In at least one embodiment, instructions 420 when executed by any one or more of the servers in VHO 120, cause the VHO 120 to perform operations 300 illustrated in FIG. 3. Data 430 represents scratch memory and other storage for use by processor 401. Operating system 440 provides the environment in which processor 401 may execute instructions 420.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A video processing method, comprising:
   receiving a first multimedia file including:
      first video content encoded in compliance with a first video compression algorithm; and
      an explicit indicator of run time;
   converting the first video content to second video content encoded in compliance with a second video compression algorithm, wherein the second video content lacks an explicit indicator of run time; and
   deriving a run time of the second video content from header information included in at least one packet of the second video content.

2. The method of claim 1, wherein the second video compression algorithm achieves greater compression than the first video compression algorithm, the method further comprising:
   storing the second video content in storage; and
   forwarding the second video content from storage to a content insertion server.

3. The method of claim 1, wherein the first video compression algorithm comprises an MPEG-2 video compression algorithm.

4. The method of claim 3, wherein the second video compression algorithm comprises a video compression algorithm selected from a group consisting of:
   an H.264 algorithm and an H.265 algorithm.

5. The method of claim 1, wherein the header information included in the at least one packet comprises a frame rate of the second video content.

6. The method of claim 5, wherein the header information further includes a frame count of the second video content.

7. The method of claim 1, further comprising:
   before converting the first video content to the second video content, performing a quality check on the first video content, wherein the quality check includes a loudness check, wherein the loudness check determines whether the second video content complies with Commercial Advertisement Loudness Mitigation (CALM) Act criteria.

8. The method of claim 7, further comprising, responsive to detecting the loudness check failing:

invoking a loudness adjuster to make a loudness adjustment;
performing the quality check for a second time; and
logging the first video content as a pre transcoding failure responsive to the second quality check failing.

9. The method of claim 1, wherein the second video content comprises an advertisement, the method further comprising:
inserting the second video file into a programming stream.

10. A video processing server, comprising:
a processor;
computer readable storage, accessible to the processor, include processor executable program instructions that, when executed by the processor, cause the processor to perform operations including:
receiving a first multimedia file including:
first video content encoded in compliance with a first video compression algorithm; and
an explicit indicator of run time;
converting the first video content to second video content encoded in compliance with a second video compression algorithm, wherein the second video content lacks an explicit indicator of run time; and
deriving a run time of the second video content from header information included in at least one packet of the second video content.

11. The server of claim 10, wherein the second video compression algorithm achieves greater compression than the first video compression algorithm, the method further comprising:
storing the second video content in storage; and
forwarding the second video content from storage to a content insertion server.

12. The server of claim 10, wherein the header information includes frame rate data indicative of a frame rate of the second video content, and pixel data indicative of a resolution of the second video content.

13. The server of claim 10, wherein the first video compression algorithm comprises an MPEG-2 video compression algorithm and wherein the second video compression algorithm comprises a video compression algorithm selected from the group consisting of: an H.264 algorithm and an H.265 algorithm.

14. The server of claim 10, wherein the header information included in the at least one packet comprises a frame rate of the second video content and a frame count of the second video content.

15. A non-transitory computer readable medium including processor executable program instructions, that when executed by a processor, cause the processor to perform operations comprising:
receiving a first multimedia file including:
first video content encoded in compliance with a first video compression algorithm; and
an explicit indicator of run time;
converting the first video content to second video content encoded in compliance with a second video compression algorithm, wherein the second video content lacks an explicit indicator of run time; and
deriving a run time of the second video content from header information included in at least one packet of the second video content.

16. The non-transitory computer readable medium of claim 15, wherein the header information included in the at least one packet comprises a frame rate of the second video content.

17. The non-transitory computer readable medium of claim 16, wherein the header information included in the at least one packet comprises a frame count of the second video content.

18. The non-transitory computer readable medium of claim 15, wherein the first video compression algorithm comprises an MPEG-2 algorithm and the second video compression algorithm comprises an H.264 algorithm.

19. The non-transitory computer readable medium of claim 15, wherein the operations include:
comparing the run time derived against a time allotted for the second multimedia content; and
taking corrective action when the run time derived and the time allotted differ by an amount exceeding a threshold.

20. The non-transitory computer readable medium of claim 19, wherein the corrective action includes replacing the first multimedia file with a replacement multimedia file.

* * * * *